United States Patent
Ohashi et al.

(10) Patent No.: US 12,050,559 B2
(45) Date of Patent: Jul. 30, 2024

(54) DATA UPDATE DEVICE, DATA UPDATE METHOD, DATA UPDATE PROGRAM, AND DATA STRUCTURE

(71) Applicant: Nippon Telegraph and Telephone Corporation, Tokyo (JP)

(72) Inventors: Shigenori Ohashi, Musashino (JP); Shigeru Fujimura, Musashino (JP); Tatsuro Ishida, Musashino (JP); Atsushi Nakadaira, Musashino (JP); Hiroki Watanabe, Musashino (JP); Junichi Kishigami, Muroran (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 73 days.

(21) Appl. No.: 17/608,352

(22) PCT Filed: May 21, 2020

(86) PCT No.: PCT/JP2020/020133
§ 371 (c)(1),
(2) Date: Nov. 2, 2021

(87) PCT Pub. No.: WO2020/241447
PCT Pub. Date: Dec. 3, 2020

(65) Prior Publication Data
US 2022/0253230 A1 Aug. 11, 2022

(30) Foreign Application Priority Data
May 29, 2019 (JP) .................. 2019-099979

(51) Int. Cl.
*G06F 16/182* (2019.01)
*G06F 3/06* (2006.01)
*G06F 16/176* (2019.01)

(52) U.S. Cl.
CPC ........ *G06F 16/1844* (2019.01); *G06F 3/0643* (2013.01); *G06F 16/176* (2019.01); *G06F 16/1834* (2019.01)

(58) Field of Classification Search
CPC .... G06F 16/27; G06F 16/182; G06F 16/1844; G06F 16/176; G06F 16/1834
(Continued)

(56) References Cited

U.S. PATENT DOCUMENTS 10,642,723 B1 * 5/2020 Krishnamoorthy ....... G06F 8/30
2016/0350950 A1 * 12/2016 Ritchie .................. G06F 40/18

FOREIGN PATENT DOCUMENTS

JP 2010272057 A * 12/2010
JP 6626228 B * 3/2019 ............. G06F 21/64
(Continued)

OTHER PUBLICATIONS

Benet, "IPFS—Content Addressed, Versioned, P2P File System (Draft 3)," available on or before Feb. 27, 2021, retrieved from URL <https://dhl-space.sfo2.digitaloceanspaces.com/assets/ipfs-p2p-file-system.pdf>, 11 pages.

*Primary Examiner* — Shahid A Alam
(74) *Attorney, Agent, or Firm* — Fish & Richardson P.C.

(57) ABSTRACT

When an updated file that is an updated version of an original file is registered in a distributed file management system 100, a difference creation unit 222 creates a difference file between the original file and the updated file, a route object creation unit 223 creates a route object that includes an ID of the original file and an ID of the difference file, and a distributed file management client 11 causes the difference file and the route object to be registered in the distributed file management system 100.

8 Claims, 11 Drawing Sheets

(58) Field of Classification Search
USPC .......................................................... 707/822
See application file for complete search history.

(56) References Cited

FOREIGN PATENT DOCUMENTS

| | | | | |
|---|---|---|---|---|
| JP | 2019079577 A | * | 5/2019 | ........... H04L 9/0637 |
| JP | 2019121946 A | * | 7/2019 | |

* cited by examiner

"Name":"ORIGINAL FILE",
"ID":12345678,
"Size":10000

"Name":"DIFFERENCE FILE",
"ID":87654321,
"Size":500
"DiffAlg": "XXXX"

"Name":"ORIGINAL FILE",
"ID":12345678,
"Size":10000

"Name":"DIFFERENCE FILE",
"ID":87654321,
"Size":500
"DiffAlg": "XXXX"

"Name":"UPDATER INFORMATION",
"ID":10000001,
"Size":100

"Data": [ .... ]

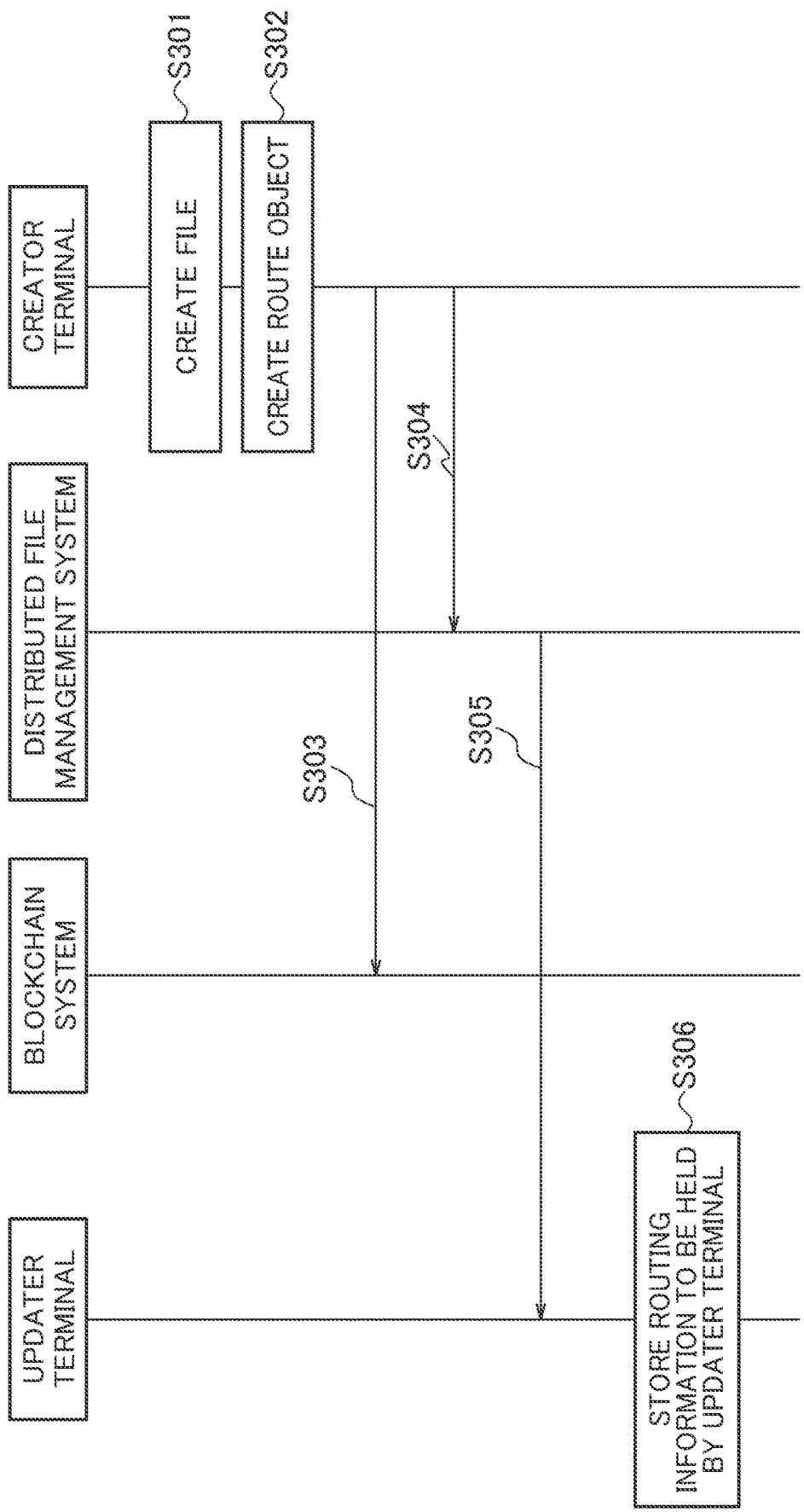

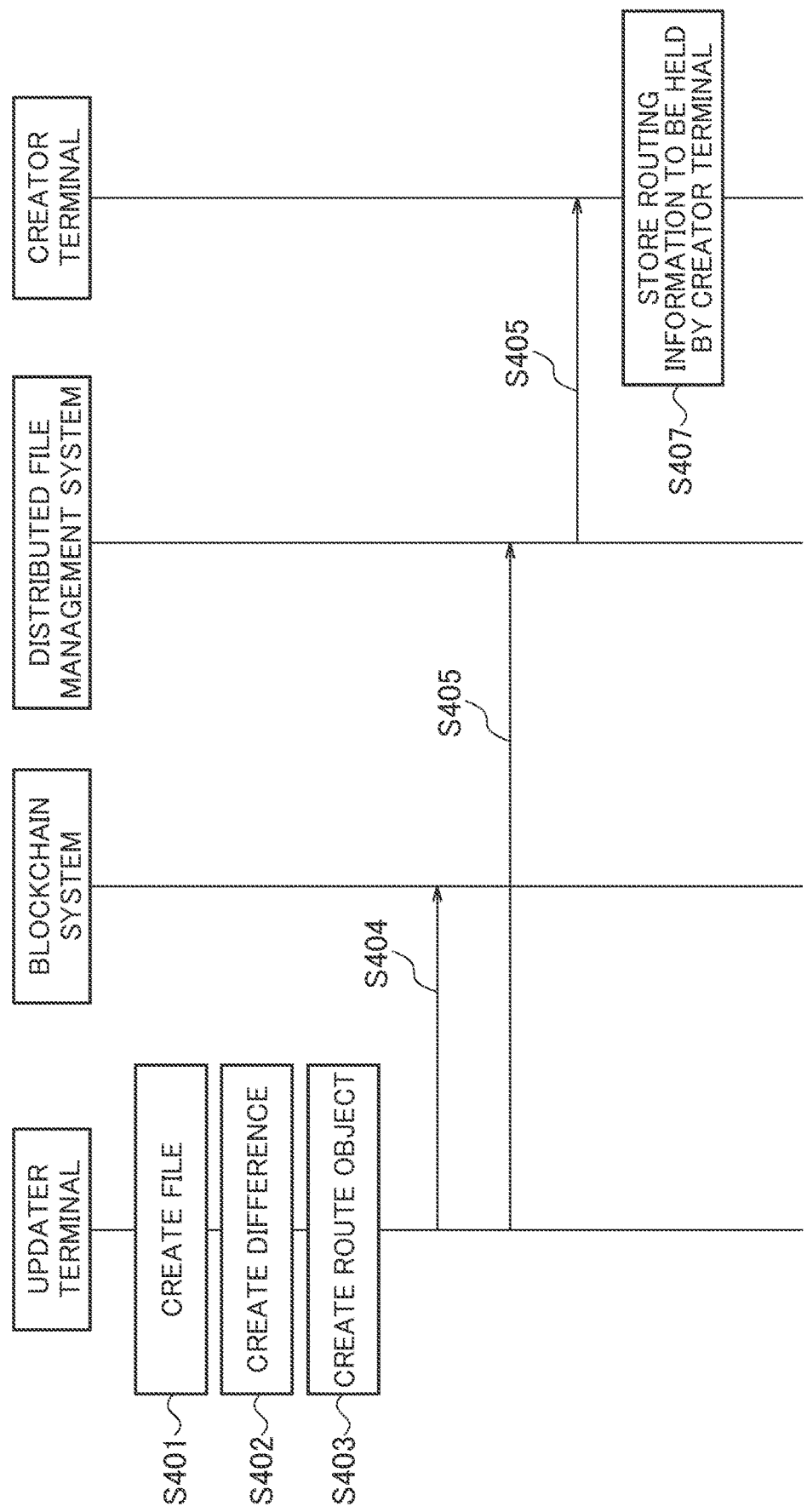

DATA UPDATE DEVICE, DATA UPDATE METHOD, DATA UPDATE PROGRAM, AND DATA STRUCTURE

CROSS-REFERENCE TO RELATED APPLICATIONS

This application is a National Stage application under 35 U.S.C. § 371 of International Application No. PCT/JP2020/020133, having an International Filing Date of May 21, 2020, which claims priority to Japanese Application Serial No. 2019-099979, filed on May 29, 2019. The disclosure of the prior application is considered part of the disclosure of this application, and is incorporated in its entirety into this application.

TECHNICAL FIELD

The present invention relates to a technique of updating a file managed in a distributed file management system.

BACKGROUND ART

IPFS (InterPlanetary File System) is known as a decentralized distributed file management system (Non-patent document 1). In the IPFS, a file is divided into chunks of a certain size and managed by terminals that belong to the IPFS. Each chunk is denoted with an ID generated from a hash value. The chunks constituting the same file are collected in a tree-shape. A link to each of the chunks constituting the file is described in a root chunk. An ID of the root chunk serves as an ID of the file. The number of divisions is determined based on a set size of the chunks and a file size. If the chunk size is larger than the file size, the file is not divided. In this case, even if the file is not divided, the file is expressed as a chunk.

CITATION LIST

Non-Patent Document

[Non-Patent Document 1] Juan Benet, "IPFS—Content Addressed, Versioned, P2P File System (DRAFT3)", [Online], Internet<URL:https://ipfs.io/ipfs/QmR7GSQM93Cx5eAg6a6yRzNde 1FQv7uL6X1o4k7zrJa3LX/ipfs.draft3.pdf>

SUMMARY OF THE INVENTION

Problem to be Solved by the Invention

The Blockchain has a mechanism that is extremely robust against the falsification. Focusing on this point, it is conceivable to cooperate the blockchain with a distributed file management system. If the blockchain is cooperated with the distributed file management systems, the distributed file management system needs to continue holding a record of a pre-updated file, in addition to an updated file.

However, a method of newly registering the updated file in the distributed file management system has a problem that file sizes to be managed in the entire system become large.

The present invention is made in view of the above described problems, and an object of the present invention is to reduce an average file size per file managed in the entire file system.

Means for Solving the Problem

An update device according to an aspect of the present invention is an update device that registers, in a distributed file management system, an updated file that is an updated version of an original file registered in the distributed file management system, and the update device includes a difference creation unit that creates difference data between the original file and the updated file, a route object creation unit that creates a route object including a link to the original file and a link to the difference data, and a file management control unit that registers the difference data and the route object in the distributed file management system.

An update method according to an aspect of the present invention is an update method performed by an update device for registering, in a distributed file management system, an updated file that is an updated version of an original file registered in the distributed file management system, and the update method includes, creating difference data between the original file and the updated file, creating a route object that includes a link to the original file and a link to the difference data, and registering, in the distributed file management system, the difference data and the route object.

A data structure according to an aspect of the present invention is a data structure of an updated file that is an updated version of an original file, and the data structure includes a link to the original file, and a link to difference data between the original file and the updated file, and in the data structure, if the original file is another updated file, the link to the original file is a link to a data structure of the another updated file, a computer is used for a process of acquiring the original file from the link to the original file, acquiring the difference data from the link to the difference data, and acquiring the updated file by applying the difference data to the original file, and if the link to the original file is the link to the data structure of the another updated file, the computer recursively processes the data structure of the another updated file.

Advantageous Effect of the Invention

According to the present invention, it is possible to reduce an average file size per file managed in the entire file system.

BRIEF DESCRIPTION OF THE DRAWINGS

FIG. 13 is a sequence diagram showing flows of processes of registering a file created in the second embodiment.

FIG. 14 is a sequence diagram showing flows of processes of registering a file updated in the second embodiment.

EMBODIMENTS OF THE INVENTION

Embodiments of the present invention will be described below with reference to the drawings.

First Embodiment

Figure 1:
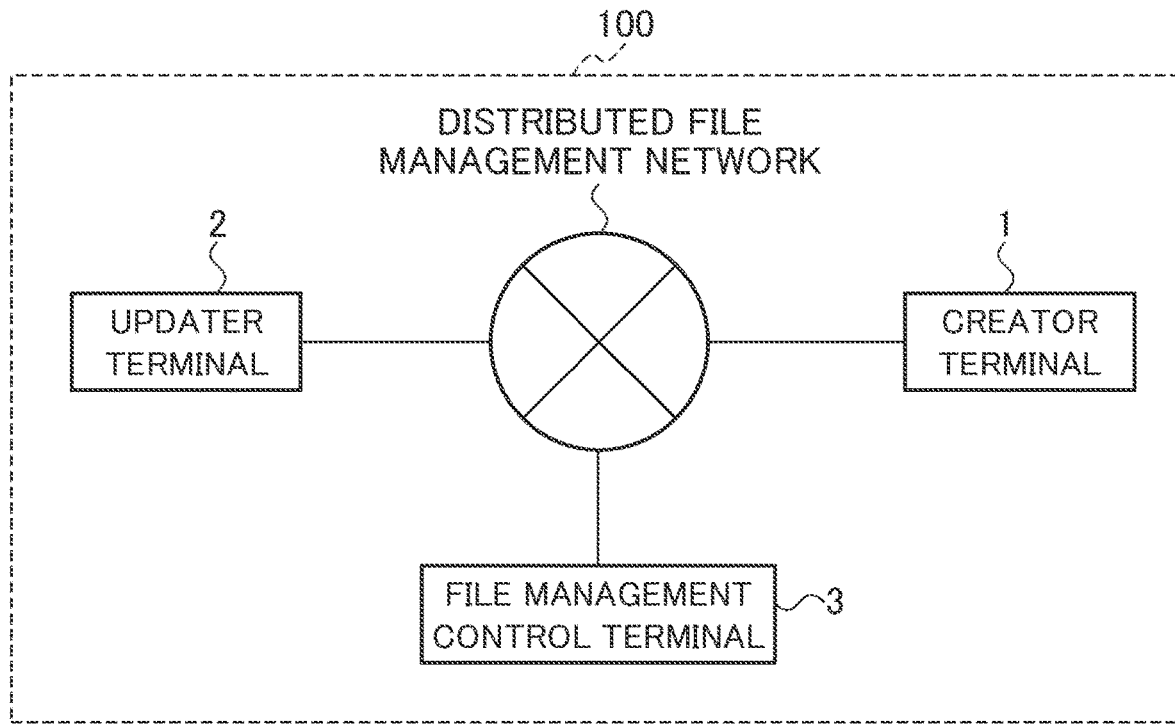
FIG. 1 is a diagram showing an entire constitution of a distributed file management system according to a first embodiment.

A distributed file management system 100 according to a first embodiment shown in FIG. 1 is a decentralized distributed file management system, in which each terminal that belongs to the distributed file management system 100 manages a file in a distributed manner. The distributed file management system 100 divides a file into chunks of a certain size, and manages the file, as a directed acyclic graph (DAG) of the divided block (chunks). A root hash value of the DAG serves as an ID of the file. By requesting a file by using an ID of the file, it is possible to acquire the file without being aware of a location of the file. The distributed file management system 100 may also manage a file in a distributed manner in the same way as in Non-patent document 1.

The distributed file management system 100 shown in FIG. 1 includes a creator terminal 1, an updater terminal 2, and a file management control terminal 3. The distributed file management system 100 may include a plurality of file management control terminals 3. The terminals (the creator terminal 1, the updater terminal 2, and the file management control terminal 3) that belong to the distributed file management system 100 make P2P (Peer to Peer) connection through the distributed file management network, and each terminal manages a file in a distributed manner. A terminal that is used by a creator who creates a file is defined as the creator terminal 1, and a terminal that is used by an updater who updates a file is defined as the updater terminal 2. Alternatively, the creator terminal 1 may update a file, or the updater terminal 2 may create the file. Another terminal may operate as the creator terminal 1 or the updater terminal 2.
(File Management Data)

Figure 2:
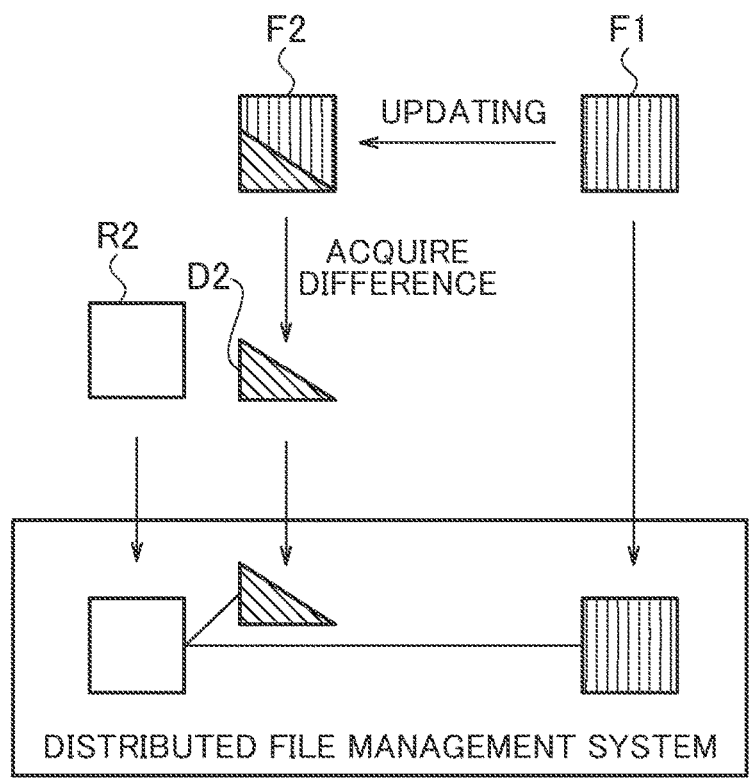
FIG. 2 is a diagram for explaining a configuration of a file managed in a distributed file management system according to the first embodiment.
Figures 3, 4:
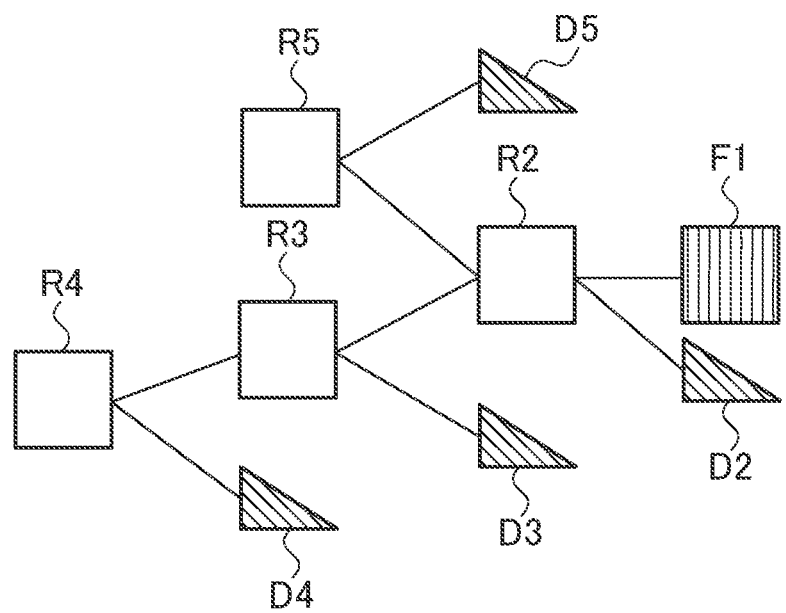
FIG. 3 is a diagram showing an example of a data structure of a route object.
FIG. 4 is a diagram showing an example of a data structure managed in a distributed file management system according to the first embodiment.

With reference to FIGS. 2 and 3, how files are managed in the distributed file management system 100 according to the first embodiment will be described.

In an example of FIG. 2, a file F2 that is an updated version of a file F1 registered in the distributed file management system 100 is registered in the distributed file management system 100.

When registering the file F2 in the distributed file management system 100, the updater terminal 2 takes a difference between the file F1 and the file F2 to creates a difference file D2, and creates a route object R2 for managing the original file F1 before the change and the difference file D2 by linking the files. The updater terminal 2 registers the created difference file D2 and route object R2 in the distributed file management system 100.

The route object R2 is an object for acquiring the file F2, and holds a link to the original file F1, and a link to the difference file D2. Specifically, for example, as shown in FIG. 3, the route object includes, for each of the original file and the difference file, a file type of a link destination, a file ID on the distributed file management system 100 (for example, a hash value of a file is used), and a file size. The route object includes information on a difference algorithm used for creating the difference file. In the distributed file management system 100, the entity of a file can be acquired by using the file ID. The route object holds the file ID, as a link to the file.

In the first embodiment, an ID of the route object R2 registered in the distributed file management system 100 is regarded as an ID of the updated file F2. If the ID of the route object R2 is provided, it is possible to acquire the file F2. If a terminal (the terminal may be any of the creator terminal 1, the updater terminal 2, and the file management control terminal 3) that belongs to the distributed file management system 100 intends to acquire the file F2, first, the terminal acquires the route object R2 from the distributed file management system 100 by using the ID of the route object R2. Then, the terminal acquires the original file F1 and the difference file D2 from the distributed file management system 100 by using the ID of the original file, and the ID of the difference file held by the route object R2. The terminal acquires the file F2 by applying the difference file D2 to the original file F1.

For the original file F1 also, the route object R1 that holds a link to the original file F1 may be registered in the distributed file management system 100, and an ID of a route object R1 may be regarded as an ID of the original file F1.

FIG. 4 shows examples of various files registered in the distributed file management system 100, if updating is repeated. In an example of FIG. 4, registered in the distributed file management system 100 are the original file F1, the route object R2 and the difference file D2 of the file F2 that is an updated version of the original file F1, a route object R3 and a difference file D3 of a file F3 that is an updated version of the file F2, a route object R4 and a difference file D4 of a file F4 that is an updated version of the file F3, and a route object R5 and a difference file D5 of a file F5 that is an updated version of the file F2.

If the file F3 that is the updated version of the file F2 is to be registered in the distributed file management system 100, the updater terminal 2 registers, in the distributed file management system 100, the difference file D3 between the file F2 and the file F3, and the route object R3 that associates the file F2 with the difference file D3. The link destination of an original file of the route object R3 is the route object R2 of the file F2.

In order to acquire the file F3, a terminal uses the ID of the route object R3 of the file F3, to acquire the route object R3 from the distributed file management system 100. To the route object R3, the route object R2 is linked as an original file, and the difference file D3 is linked also as a difference file. Then, the terminal uses information held by the route object R3, to acquire the route object R2 and the difference file D3 from the distributed file management system 100. The terminal recursively processes the route object R2, to acquire the file F2, and acquires the file F1 and the difference file D2 from the distributed file management system 100 by using information held by the route object R2. The terminal acquires the file F2 by applying the difference file D2 to the file F1. Then, the terminal acquires the file F3 by applying the difference file D3 to the file F2.

The distributed file management system 100 may have a function of checking whether a file that is an updated version of a certain file is present. This function can be easily realized by using a distributed hash table which is used to manage where a file is located in a distributed file management system. An updater registers a value of an updated route object in the distributed hash table by using a route object before the update as a key. A person who intends to check whether updating is performed can acquire an ID of the updated route object by querying the distributed hash table by using an ID of a route object that the person has as a key. By acquiring the route object and checking a link of the object, it possible to check whether the object is an object updated from the route object used in the query key.

(Constitutions of Terminals)

Figure 5:
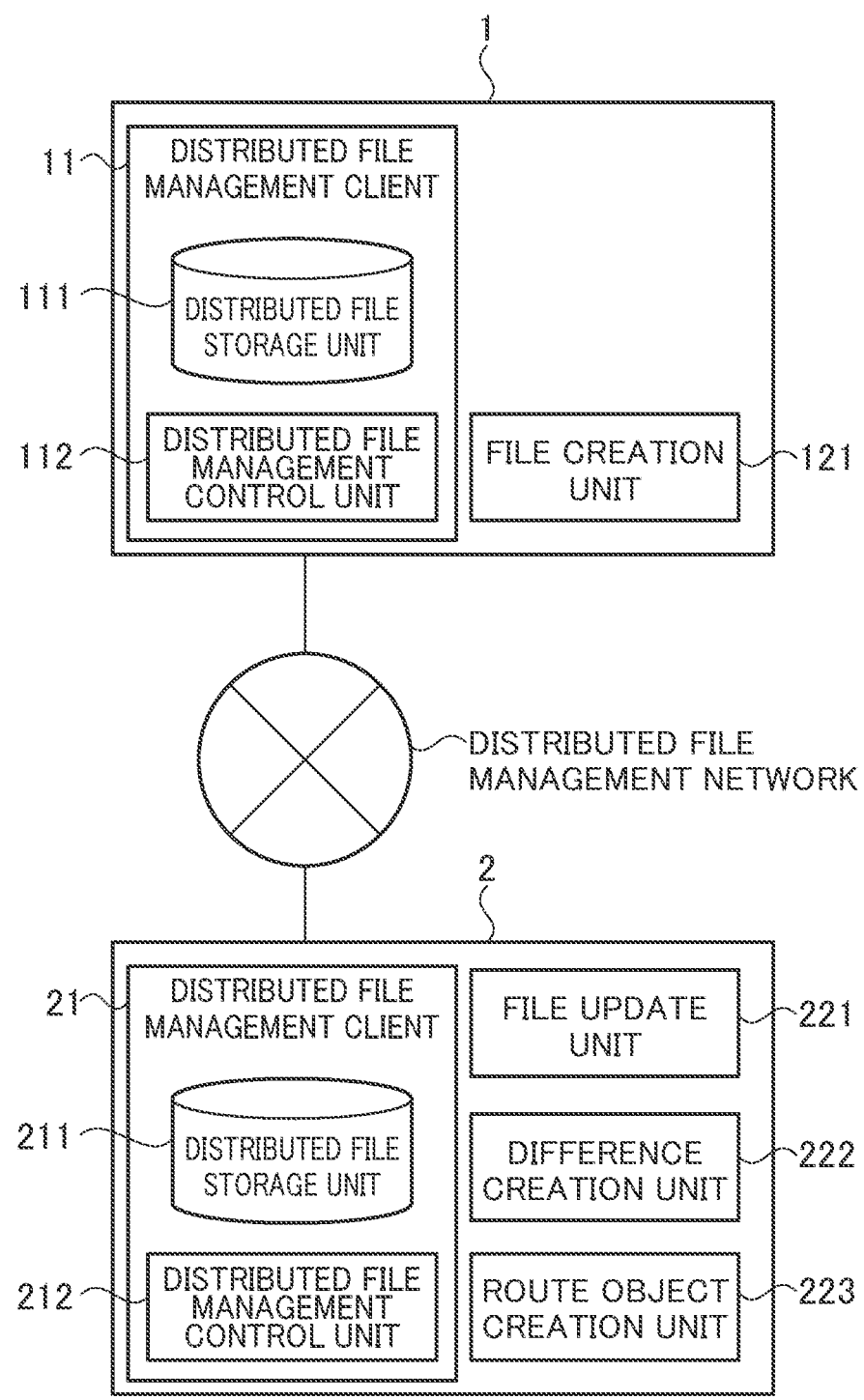
FIG. 5 is a diagram showing constitutions of a creator terminal and an updater terminal in a distributed file management system according to the first embodiment.

With reference to FIG. 5, constitutions of the creator terminal 1 and the updater terminal 2 according to the first embodiment will be described.

First, descriptions will be given for the creator terminal 1. The creator terminal 1 shown in FIG. 5 includes a distributed file management client 11 and a file creation unit 121.

The distributed file management client 11 includes a distributed file storage unit 111 and a distributed file management control unit 112.

The distributed file storage unit 111 stores files managed in the distributed file management system 100 in a distributed manner and information necessary for the distributed management of files. For example, the distributed file storage unit 111 stores chunks of a predetermined size which are obtained by dividing a file, and routing information in which an ID of a file and an identifier of a terminal that holds the file are associated with each other. The routing information is held by each terminal that belongs to the distributed file management system 100 in a distributed manner. By a terminal using an ID of a file to request the file from the distributed file management system 100, it is possible to specify a terminal that holds the file corresponding to the ID, and accordingly, the file can be acquired from the terminal.

The distributed file management control unit 112 registers a file in the distributed file management system 100, acquires a file from the distributed file management system 100, and manages information stored in the distributed file storage unit 111. For example, if a file created by the file creation unit 121 is to be registered in the distributed file management system 100, the distributed file management control unit 112 divides the file into chunks of a predetermined size to form the DAG, and then acquires an ID of the file. The distributed file management control unit 112 stores the chunks in the distributed file storage unit 111, and also notifies the distributed file management system 100 of the ID of the file and an identifier of the terminal itself. This enables the distributed file management system 100 to recognize the terminal holding the entity of a file specified by the ID of the file. The distributed file management control unit 112 may notify the distributed file management system 100 of IDs of all the chunks forming the file, in addition to an ID of a root chunk serving as the ID of the file.

The file creation unit 121 creates a file. The file creation unit 121 can be formed from a commercially available application for creating a file. A file to be created may be any type of file such as, for example, a document file, an image file, a music file, or a video file.

Next, descriptions will be given for the updater terminal 2. The updater terminal 2 shown in FIG. 5 includes a distributed file management client 21, a file update unit 221, a difference creation unit 222, and a route object creation unit 223.

The distributed file management client 21 includes a distributed file storage unit 211, and a distributed file management control unit 212. The distributed file storage unit 211 and the distributed file management control unit 212 are similar to the distributed file storage unit 111 and the distributed file management control unit 112 of the creator terminal 1.

The file update unit 221 updates a file acquired from the distributed file management system 100. The file update unit 221 can be formed from an application which is the same as the application forming the file creation unit 121 of the creator terminal 1.

The difference creation unit 222 creates a difference file between an original file before an update, and a file that is an updated version of the original file and that is updated by the file update unit 221. The difference file may be in any format, as long as the updated file can be reconfigured by applying the difference file to the original file. The difference creation unit 222 selects an optimum algorithm from a plurality of algorithms, depending on formats of the updated file and the original file. An algorithm associated with an extension may be set in advance, and an algorithm may be selected in accordance with the setting, or a difference file may be actually created with a plurality of algorithms first, and then, an algorithm in which the difference file becomes the smallest may be adopted. If the difference between the difference file and the updated file is small, the distributed file management client 21 may register the updated file itself. The difference file is registered in the distributed file management system 100 by the distributed file management client 21.

The route object creation unit 223 creates a route object that associates an original file and a difference file registered in the distributed file management system 100. Specifically, the route object creation unit 223 creates the route object that includes an ID of the original file and an ID of the difference file. The route object creation unit 223 records, in the route object, information on a difference algorithm used for the creation of the difference file. If the difference file is an updated file itself, the route object creation unit 223 records, in the route object, a feature that the file associated with the route object is the updated file. For example, if the difference algorithm is not described in the route object, it may be determined that a file associated with the route object is the updated file, instead of being the difference file. The route object is registered in the distributed file management system 100 by the distributed file management client 21.

The file management control terminal 3 has functions which are similar to those of the distributed file management clients 11 and 21.

Each unit of the creator terminal 1 and the updater terminal 2 may be constituted from a computer that has an arithmetic processing unit, a storage device, and the like, and processes of each unit may be executed by a program. The program is stored in storage devices of the creator terminal 1 and the updater terminal 2, and the program can be recorded in recording media such as a magnetic disk, an optical disk, and a semiconductor memory, or alternatively provided through the network.

(Creation of Files)

Figure 6:
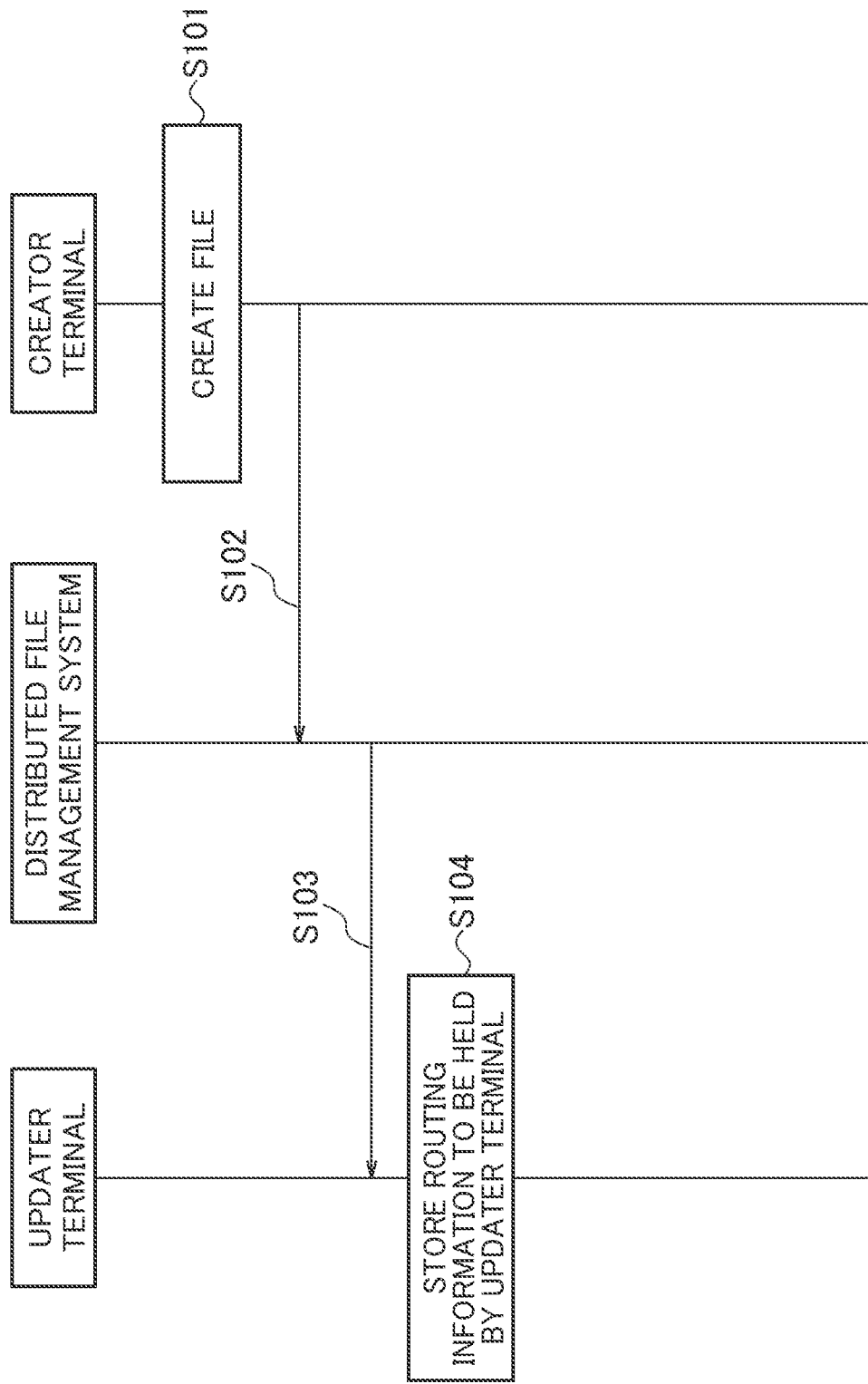
FIG. 6 is a sequence diagram showing flows of processes of registering a file created in the first embodiment.

With reference to FIG. 6, a process in which the creator terminal 1 creates a file and registers the file in the distributed file management system 100 will be described.

In step S101, the creator terminal 1 creates a file.

In step S102, the creator terminal 1 registers the file in the distributed file management system 100. Specifically, the creator terminal 1 divides the file into chunks to form the DAG, and acquires an ID of a root chunk as an ID of the file. The distributed file storage unit 111 stores the divided chunks and IDs of the chunks. The creator terminal 1 notifies the terminals that belong to the distributed file management system 100 of the ID of the file and an identifier of the creator terminal 1.

In step S103, the updater terminal 2 receives the notification of step S102. Another terminal that belongs to the distributed file management system 100 may also receive the notification of step S102.

In step S104, if there is routing information to be held by the updater terminal 2, the updater terminal 2 causes the distributed file storage unit 211 to store the routing information based on the notified content.

By performing the above described processes, the file created by the creator terminal 1 is registered in the distributed file management system 100. The terminals that belong to the distributed file management system 100 can acquire the file from the distributed file management system 100 by using an ID of the file.

(Updating of Files)

Figure 7:
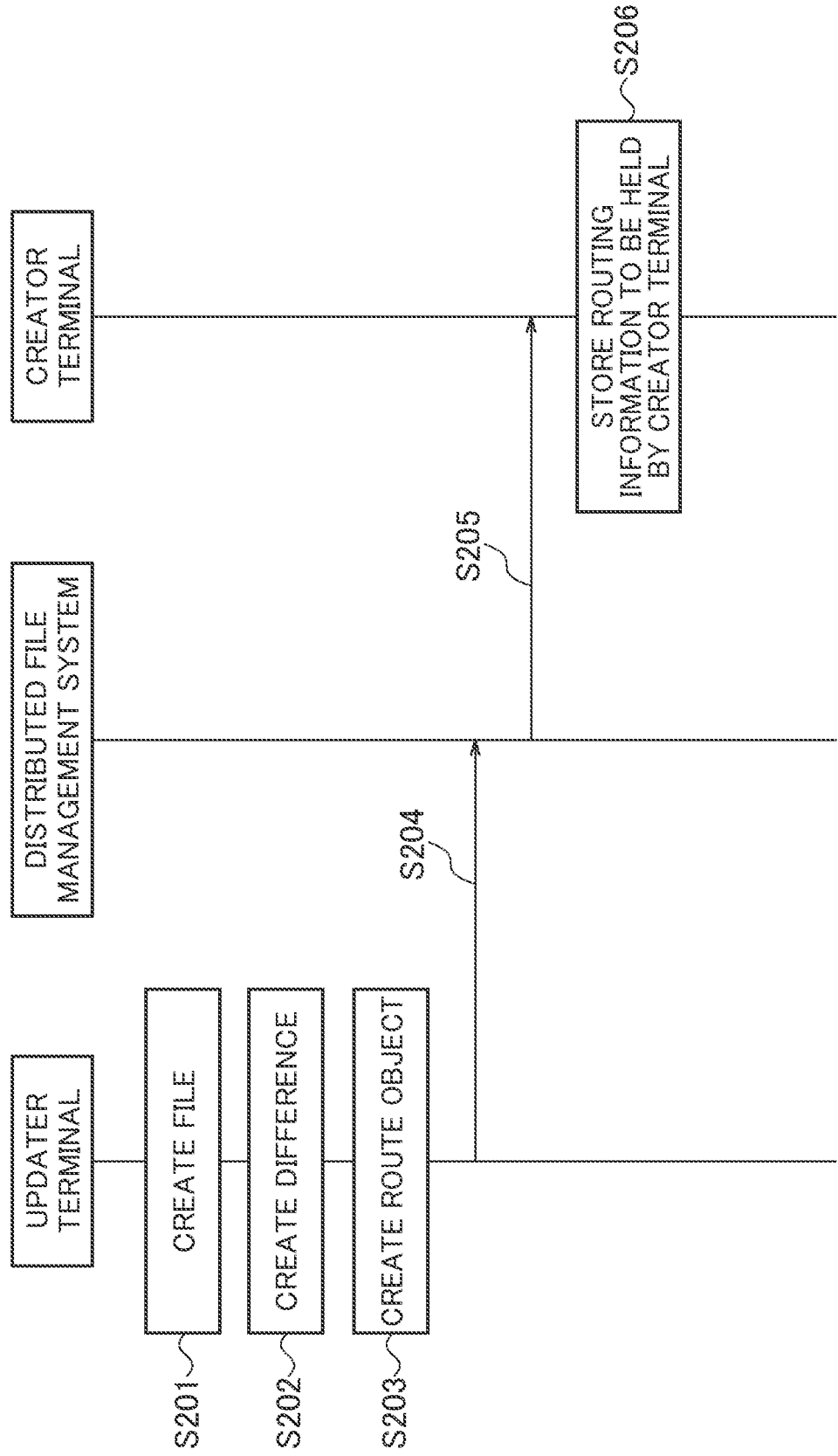
FIG. 7 is a sequence diagram showing flows of processes of registering a file updated in the first embodiment.

With reference to FIG. 7, a process in which the updater terminal 2 updates a file and registers the file in the distributed file management system 100 will be described.

It is assumed that the updater terminal 2 has already acquired an original file to be updated from the distributed file management system 100.

In step S201, the updater terminal 2 updates an original file.

In step S202, the updater terminal 2 creates a difference file between the original file and an updated file that is an updated version of the original file.

In step S203, the updater terminal 2 creates a route object that associates the original file with the difference file. For example, the updater terminal 2 creates a route object that holds an ID of the original file and an ID of the difference file. If a received difference file has a size that is almost the same as a size of the updated file, the updated file is associated with the route object together with the original file, instead of associating the difference file to the route object.

In step S204, the updater terminal 2 registers the difference file and the route object in the distributed file management system 100. Specifically, the updater terminal 2 acquires a hash value of the difference file to use the hash value as an ID of the difference file, and acquires a hash value of the route object to use the has value as an ID of the route object. The updater terminal 2 divides the file into chunks, if necessary, and causes the distributed file storage unit 211 to store the difference file and the route object. The updater terminal 2 notifies the terminals that belong to the distributed file management system 100 of the ID of the difference file, the ID of the route object, and an identifier of the updater terminal 2.

In step S205, the creator terminal 1 receives the notification of step S204. Another terminal that belongs to the distributed file management system 100 may also receive the notification of step S204.

In step S206, if there is routing information to be held by the creator terminal 1, the creator terminal 1 causes the distributed file storage unit 111 to store the routing information based on the notified content.

By performing the above described processes, a file updated by the updater terminal 2 is registered in the distributed file management system 100. The terminals that belong to the distributed file management system 100 can acquire the updated file from the distributed file management system 100 by using the ID of the route object.

As described above, in the distributed file management system 100 according to the present embodiment, when the file that is the updated version of the original file is to be registered in the distributed file management system 100, the difference creation unit 222 creates the difference file between the original file and the updated file, the route object creation unit 223 creates the route object that includes the ID of the original file and the ID of the difference file, and the distributed file management client 11 registers the difference file and the route object in the distributed file management system 100. This causes the difference file to be registered in the distributed file management system 100 instead of registering the entire updated file, and thus, it is possible to reduce an average file size per file managed in the entire distributed file management system 100.

Second Embodiment

Figure 8:
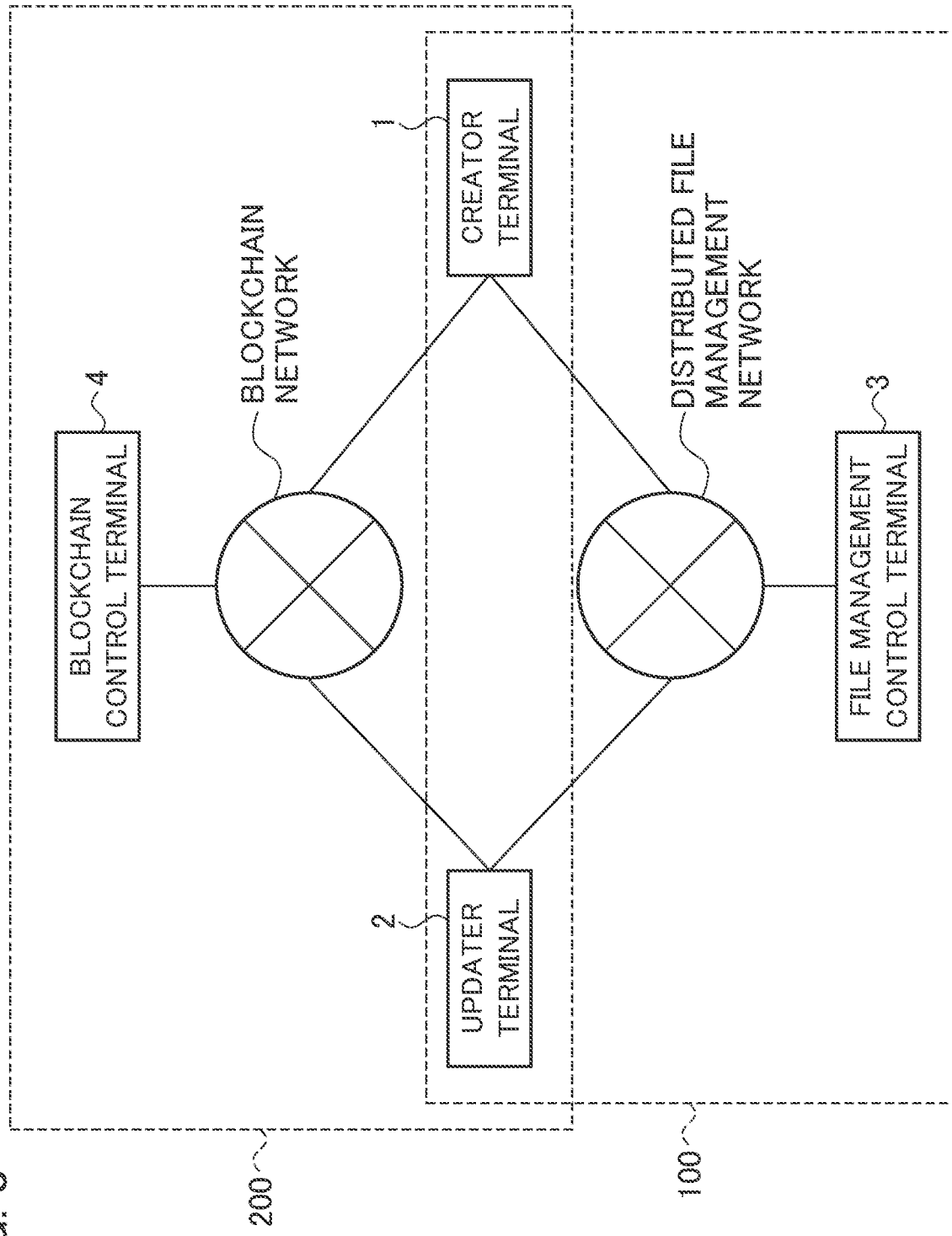
FIG. 8 is a diagram showing entire configurations of a distributed file management system and a blockchain system according to a second embodiment.

The creator terminal 1 and the updater terminal 2 according to a second embodiment shown in FIG. 8 belong to a distributed file management system 100 and a blockchain system 200. The distributed file management system 100 is similar to the system in the first embodiment.

The blockchain system 200 shown in FIG. 8 includes a creator terminal 1, an updater terminal 2, and a blockchain control terminal 4. The blockchain system 200 may include a plurality of blockchain control terminals 4. Terminals (the creator terminal 1, the updater terminal 2, and the blockchain control terminal 4) that belong to the blockchain system 200 make P2P connection via the blockchain network, and share blockchain data (a distributed ledger) among the terminals. The blockchain data is data in which blocks including transactions issued by the terminals that belong to the blockchain system 200 are linked.

In the present embodiment, registered in the blockchain system 200 is a contract that manages an ID of a route object which is necessary for acquiring a file registered in the distributed file management system 100, and an ID of a creator or an updater of the file. The contract is a mechanism that executes a program on a blockchain in response to a transaction. After a transaction for causing the contract to be executed is issued, the program is executed, when the transaction is collected in a block in the blockchain system 200. In the present embodiment, the authenticity of the creator and the updater is ensured by registering, in the blockchain system 200, the ID of the route object and information on the creator or the updater of the file that can be acquired from the route object.

(File Management Data)

Figures 9, 10:
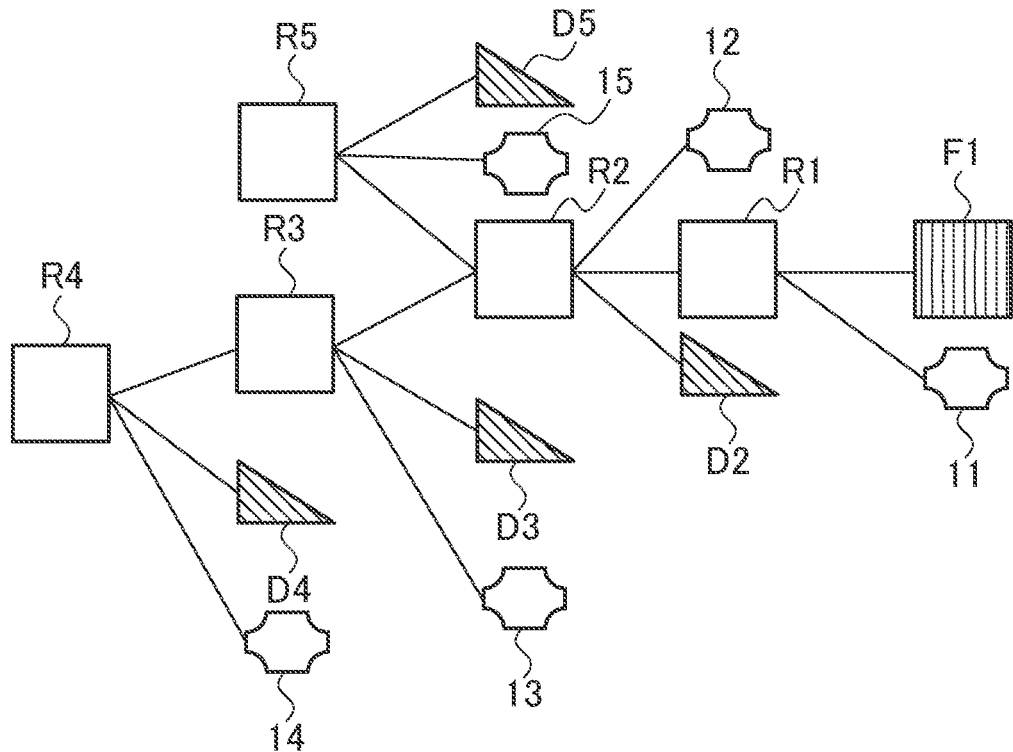
FIG. 9 is a diagram showing an example of a data structure managed in a distributed file management system according to the second embodiment.
FIG. 10 is a diagram showing an example of a data structure of a route object.

With reference to FIGS. 9 and 10, how files are managed in the distributed file management system 100 according to the second embodiment will be described.

In the second embodiment, route objects R1 to R5 include links to information files I1 to I5, and an identifier of a contract registered in the blockchain system 200. The information file I1 holds information on a file. Examples of the information on the file include, for example, information on the creation, update, and right of the file, such as a creator and an updater of the file. The terminals that belong to the blockchain system 200 can access the information registered in the contract by using an identifier of the contract.

When the file F1 is to be registered in the distributed file management system 100, the creator terminal 1 registers, in the distributed file management system 100, the route object R1 that includes a link to the file F1, a link to the information file I1 holding information on the file F1 (for example, an ID of a creator of the file F1), and an identifier of the contract. The ID of the route object R1 is used as the ID of the file F1.

As shown in an example of FIG. 10, the route object includes, for each of the original file, the difference file, and the information file, a file type of the link destination, a file ID on the distributed file management system 100, and a file size. Furthermore, the route object includes the identifier of the contract as data.

Figure 11:
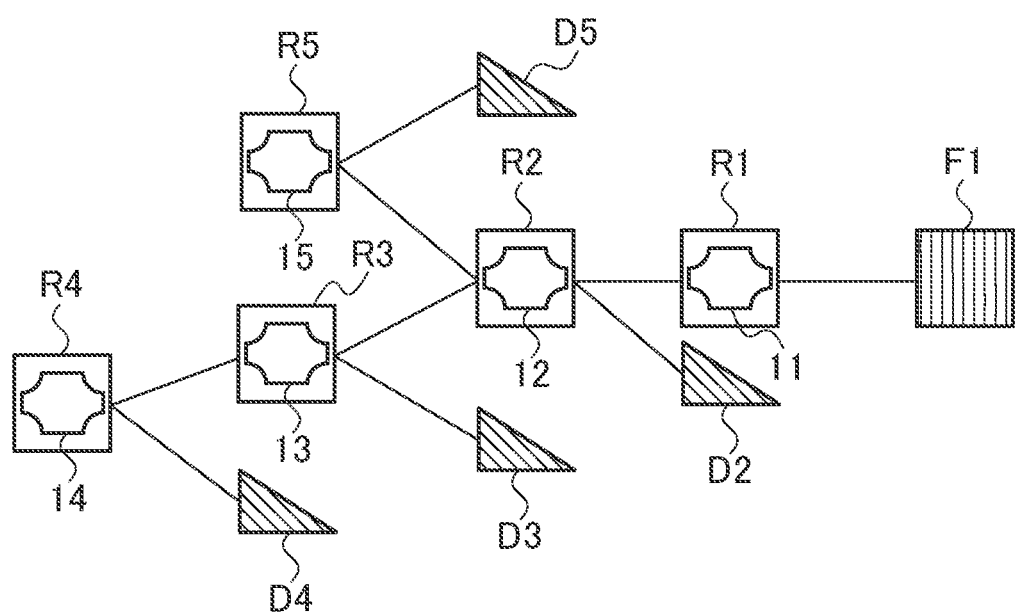
FIG. 11 is a diagram showing an example of a data structure managed in a distributed file management system according to the second embodiment.

As shown in FIG. 11, the contents of the information files I1 to I5 may be included in the data of the route object.

(Constitutions of Terminals)

Figure 12:
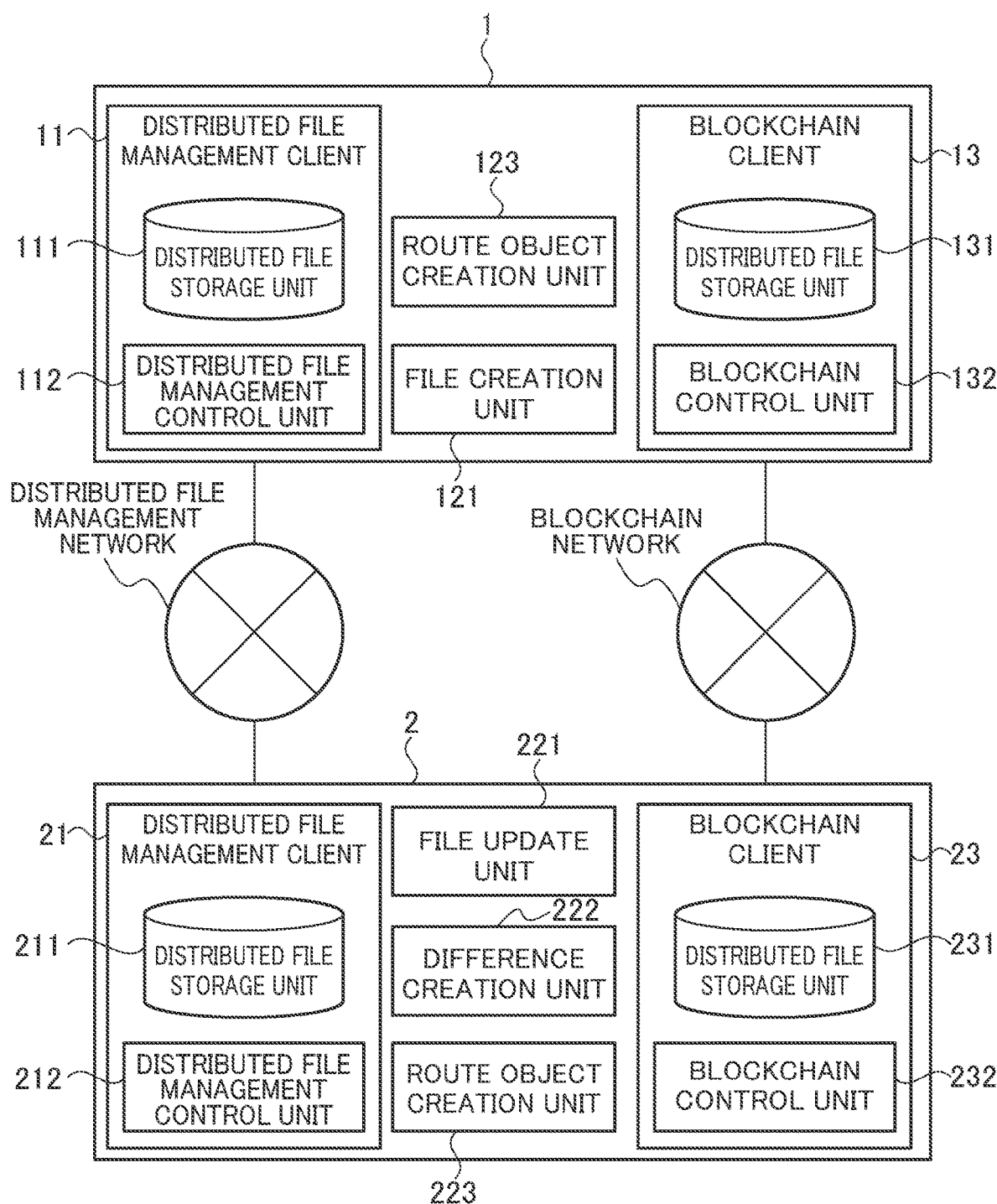
FIG. 12 is a diagram showing constitutions of a creator terminal and an updater terminal in a distributed file management system according to the second embodiment.

With reference to FIG. 12, constitutions of the creator terminal 1 and the updater terminal 2 according to the second embodiment will be described.

First, descriptions will be given for the creator terminal 1. The creator terminal 1 shown in FIG. 12 includes a distributed file management client 11, a file creation unit 121, a route object creation unit 123, and a blockchain client 13.

The distributed file management client 11 and the file creation unit 121 are the same as those in the first embodiment. A file created by the file creation unit 121 is registered in the distributed file management system 100 by the distributed file management client 11.

The route object creation unit 123 creates a route object that holds a link to a file registered in the distributed file management system 100, information on the file, and an identifier of a contract. The route object is registered in the distributed file management system 100 by the distributed file management client 11.

The route object creation unit 123 may create an information file that holds information on a file, the route object may hold a link to the information file, and the distributed file management client 11 may register the information file in the distributed file management system 100.

The blockchain client 13 includes a blockchain storage unit 131 and a blockchain control unit 132. The blockchain storage unit 131 stores blockchain data gently synchronized with all of the terminals that belong to the blockchain system 200. The blockchain control unit 132 autonomously and decentrally cooperates with the terminals that belong to the blockchain system 200, to keep a system of the blockchain. In the present embodiment, the blockchain client 13 registers the ID of the route object and the ID of the creator in the blockchain system 200.

Next, descriptions will be given for the updater terminal 2. The updater terminal 2 shown in FIG. 12 includes a distributed file management client 21, a file update unit 221, a difference creation unit 222, a route object creation unit 223, and a blockchain client 23.

The distributed file management client 21, the file update unit 221, and the difference creation unit 222 are the same as those in the first embodiment. A file updated by the file update unit 221 and a difference file created by the difference creation unit 222 are registered in the distributed file management system 100 by the distributed file management client 21.

The route object creation unit 223 creates a route object that holds a link to the original file, a link to the difference file, information on an updated file, and an identifier of a contract. The route object is registered in the distributed file management system 100 by the distributed file management client 21.

The route object creation unit 223 may create an information file that holds information on the updated file, the route object may hold a link to the information file, and the distributed file management client 21 may register the information file in the distributed file management system 100.

The blockchain client 23 includes a blockchain storage unit 231 and a blockchain control unit 232. The blockchain storage unit 231 and the blockchain control unit 232 are the same as the blockchain storage unit 131 and the blockchain control unit of the creator terminal 1. In the present embodiment, the blockchain client 23 registers the ID of the route object and the ID of the updater in the blockchain system 200. The blockchain client 23 may check whether the ID of the route object of the file acquired from the distributed file management system 100, and the ID of the creator or the updater of the file are registered in the blockchain system 200, in order to check the authenticity of the creator or the updater of the file.

The blockchain control terminal 4 has functions similar to those of the blockchain clients 13 and 23.

Each unit of the creator terminal 1 and the updater terminal 2 may be constituted from a computer that includes an arithmetic processing unit, a storage device, and the like, and processes of each unit may be executed by a program. The program is stored in storage devices of the creator terminal 1 and the updater terminal 2, and the program can be recorded in recording media such as a magnetic disk, an optical disk, and a semiconductor memory, or alternatively provided through the network.

(Creation of Files)

With reference to FIG. 13, a process in which the creator terminal 1 creates a file and registers the file in the distributed file management system 100 will be described.

In step S301, the creator terminal 1 creates a file.

In step S302, the creator terminal 1 creates a route object that includes an ID of the file, information on the file, and an identifier of a contract. It is assumed that the contract has already been registered in the blockchain system 200, and that the identifier of the contract is known. The information on the file includes the ID of the creator. The creator terminal 1 may create an information file that includes the information on the file, and may cause the ID of the information file to be included in the route object.

In step S303, the creator terminal 1 provides the ID of the route object of the created file, and the ID of the creator to the contract to register the IDs in the contract. The creator terminal 1 may further provide an ID of an updater who is permitted to update the file to the contract to register the ID in the contract.

In step S304, the creator terminal 1 registers the file and the route object in the distributed file management system 100. Specifically, the creator terminal 1 divides the file into chunks if necessary, causes the distributed file storage unit 111 to store the file and the route object, and notifies the terminals that belong to the distributed file management system 100 of the ID of the file, the ID of the route object, and the identifier of the creator terminal 1.

In step S305, the updater terminal 2 receives the notification of step S304.

In step S306, if there is routing information to be held by the updater terminal 2, the updater terminal 2 causes the distributed file storage unit 211 to store the routing information based on the notified content.

By performing the above described processes, the file created by the creator terminal 1 is registered in the distributed file management system 100. The terminals that belong to the distributed file management system 100 can acquire the file from the distributed file management system 100 by using the ID of the route object of the file. By checking that the ID of the route object, and the ID of the creator are registered in the blockchain system 200, the authenticity of the creator can be checked.

(Updating of Files)

With reference to FIG. 14, a process in which the updater terminal 2 updates a file and registers the file in the distributed file management system 100 will be described. It is assumed that the updater terminal 2 has already acquired an original file to be updated from the distributed file management system 100.

In step S401, the updater terminal 2 updates the original file.

In step S402, the updater terminal 2 creates a difference file between the original file and a file that is an updated version of the original file.

In step S403, the updater terminal 2 creates a route object that includes the ID of the original file, the ID of the difference file, information on the updated file, and the identifier of the contract. The identifier of the contract can be acquired from the route object of the original file. The information on the file includes the ID of the updater. The updater terminal 2 may create an information file that includes the information on the updated file and may cause the ID of the information file to be included in the route object.

In step S404, the updater terminal 2 provides, to the contract, the ID of the route object of the updated file and the ID of the updater, and registers the IDs in the contract. If the ID of the route object and the ID of the updater are not able to be registered to the contract by processing of the contract, processes at and after step S405 may be stopped. For example, if the updater terminal 2 does not have the right to update the original file, the registration of the ID of the route object and the ID of the updater, to the contract is rejected by processing of the contract.

In step S405, the updater terminal 2 registers the difference file and the route object in the distributed file management system 100. Specifically, the updater terminal 2 divides the file into chunks if necessary, causes the difference file and the route object to be stored to the distributed file storage unit 111, and notifies the terminals that belong to the distributed file management system 100 of the ID of the difference file, the ID of the route object, and the identifier of the updater terminal 2.

In step S406, the creator terminal 1 receives the notification of step S405.

In step S407, if there is routing information to be held by the creator terminal 1, the creator terminal 1 causes the routing information to be stored in the distributed file storage unit 111 based on the notified content.

By performing the above described processes, the file updated by the updater terminal 2 is registered in the distributed file management system 100. The terminals that belong to the distributed file management system 100 can acquire the updated file from the distributed file management system 100 by using the ID of the route object of the updated file.

The terminals that belong to both the distributed file management system 100 and the blockchain system 200 can check the authenticity of the updater by acquiring the ID of the updater, and the identifier of the contract from the route object acquired from the distributed file management system 100, and checking whether the ID of the updater and the ID of the route object are registered in the contract.

As described above, according to the present embodiment, the route object creation unit 223 creates a route object that holds the ID of the updater and the identifier of the contract, and the blockchain client 23 registers, in the contract, the ID of the route object and the ID of the updater, so that the authenticity of the updater can be confirmed by checking that the ID of the route object and the ID of the updater are registered in the blockchain system 200.

EXPLANATION OF THE REFERENCE NUMERALS

1 Creator terminal
11 Distributed file management client
111 Distributed file storage unit
112 Distributed file management control unit
121 File creation unit
123 Route object creation unit
13 Blockchain client
131 Blockchain storage unit
132 Blockchain control unit
2 Updater terminal
21 Distributed file management client
211 Distributed file storage unit
212 Distributed file management control unit
221 File update unit
222 Difference creation unit
223 Route object creation unit
23 Blockchain client
231 Blockchain storage unit
232 Blockchain control unit
3 File management control terminal
4 Blockchain control terminal
100 Distributed file management system
200 Blockchain system

The invention claimed is:

1. An update device for registering, in a distributed file management system, an updated file that is an updated version of an original file registered in the distributed file management system, the update device comprising:
   a difference creation unit, including one or more processors, configured to create difference data between the original file and the updated file; and
   a route object creation unit, including one or more processors, configured to create a route object including a link to the original file and a link to the difference data; and
   a file management control unit, including one or more processors, configured to register the difference data and the route object in the distributed file management system, and configured to register the route object in a distributed hash table of the distributed file management system using an ID of an original route object as a key, wherein
   the update device belongs to a distributed ledger system;
   the route object includes information on the updated file and an identifier of a contract executed in the distributed ledger system, and
   the update device further comprises:
      a registration unit, including one or more processors, configured to register, in the contract, the information on the updated file and the link to the route object.

2. The update device according to claim 1, wherein the link to the original file is a link to a route object of another updated file.

3. The update device according to claim 1, wherein the route object includes information on an algorithm used for creation of the difference data.

4. The update device according to claim 1, further comprising:
a blockchain control system, including one or more processors, configured to register the ID of the route object in a smart contract stored in a blockchain system.

5. An update method performed by an update device for registering, in a distributed file management system, an updated file that is an updated version of an original file registered in the distributed file management system, the update method comprising:
creating difference data between the original file and the updated file;
creating a route object that includes a link to the original file and a link to the difference data; and
registering, in the distributed file management system, the difference data and the route object, and registering the route object in a distributed hash table of the distributed file management system using an ID of an original route object as a key, wherein:
the update device belongs to a distributed ledger system;
the route object includes information on the updated file and an identifier of a contract executed in the distributed ledger system, and
the update method further comprises:
registering, by the update device, in the contract, the information on the updated file and the link to the route object.

6. The update method according to claim 5, wherein the link to the original file is a link to a route object of another updated file.

7. The update method according to claim 5, wherein the route object includes information on an algorithm used for creation of the difference data.

8. A non-transitory computer readable storage medium having data recorded thereon; where the data comprise data structure of an updated file that is an updated version of an original file, the data structure comprising:
a link to the original file;
a link to difference data between the original file and the updated file; and
information on the updated file and an identifier of a contract executed in a distributed ledger system; wherein
if the original file is another updated file, the link to the original file is a link to a data structure of the another updated file;
a computer that belongs to the distributed ledger system is used for a process of acquiring the original file from the link to the original file, acquiring the difference data from the link to the difference data, and acquiring the updated file by applying the difference data to the original file, and wherein the computer is configured to check whether an update has been performed on the original file by querying a distributed hash table using an ID of the original file as a key, and register, in the contract, the information on the updated file and the link to the data structure, and
if the link to the original file is the link to the data structure to the another updated file, the computer recursively processes the data structure of the another updated file.

* * * * *